2,700,053

BLUE-FLUORESCENT DYESTUFFS

Walter Valentine Wirth, Woodstown, N. J., and Stanley Earl Krahler, Wilmington, Del., assignors to E. I. du Pont de Nemours & Company, Wilmington, Del., a corporation of Delaware No Drawing. Application October 15, 1948, Serial No. 54,814

3 Claims. (Cl. 260—507)

This invention relates to new blue-fluorescent dyestuffs and more particularly to benzoylamino-stilbene-disulfonic acids substituted in the benzoyl nuclei with alkoxy groups.

It is an object of this invention to provide new cellulose-substantive, blue-fluorescent dyestuffs, which are useful particularly for imparting whiteness to textile materials and related cellulosic fibers. Other and further important objects of this invention will appear as the description proceeds.

In copending applications Ser. Nos. 29,663 and 29,664 (now abandoned) it was taught that 4,4'-dibenzoyl-diamino-2,2'-disulfo-stilbenes which carry in each benzoyl ring an alkyloxy radical in para-position are substantive to cellulose and are characterized particularly by a pronounced bluish fluorescence, when illuminated by ultra-violet light. Thus, the compounds are characterized by absorption of light in the ultra-violet spectrum, with at least one absorption maximum within the region of 3000 to 4000 Angstrom units. When cellulosic material, for instance textile fabric or paper, is treated with an aqueous solution of one of these compounds and then exposed to ultra-violet radiation, the cellulosic material glows with a bluish fluorescence.

As specific illustrations of such compounds, the above applications name 4,4'-bis-(p-alkoxy-benzoylamino)-stilbene-2,2'-disulfonates and 4,4'-bis-(3,4-dialkoxy-benzoylamino)-stilbene-2,2'-disulfonates.

We have now found that whitening agents of even greater potency are obtained by selecting for the purpose a bis-benzoylamino-stilbene disulfonate carrying in each benzoyl nucleus two methoxy groups, which are disposed in positions 2,4 or 2,5, the position of the CONH group being counted as 1, and the benzoyl radical being free of other substituents. Expressed in different words, we have discovered new and superior blue-fluorescents in a limited group of compounds characterized by the following structure:

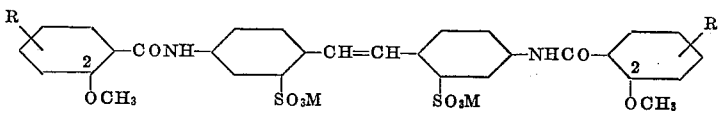

wherein R is a methoxy radical attached in one of the positions 4, 5. M in the above formula may represent hydrogen, or a suitable cation, for instance sodium, potassium, ammonium, trimethyl-ammonium, pyridinium, etc.

The new compounds may be prepared by methods which are per se known in the art, or by the special, improved procedures described and claimed in the copending applications Serial Nos. 35,985 and 35,986 (Patents Nos. 2,497,130 and 2,497,131 issued February 14, 1950).

Without limiting our invention, the following examples are given to illustrate our preferred mode of procedure. Parts mentioned are by weight.

EXAMPLE 1

A mixture of 50 parts of 4,4'-diamino-stilbene-2,2'-disulfonic acid, 61.9 parts of 2,4-dimethoxy-benzoic acid, 28.2 parts of phosphorus oxychloride and 300 parts of pyridine is heated at reflux for 45 minutes. At the end of this time the reaction is essentially complete, as shown by treatment of a small portion of the reaction mixture with cold nitrous acid and alkaline R-salt; a purple color indicates incomplete reaction. The hot mixture is drowned into 2000 parts of water and made just alkaline with 39 parts of sodium hydroxide. The drowned product is treated with 200 parts of salt, cooled to 25° C., filtered, washed free of excess alkali with 5% salt solution and dried. The pale tan product, sodium-4,4'-bis(2,4-dimethoxy-benzoylamino)-stilbene-2,2'disulfonate, is substantive to cellulosic fiber from an aqueous bath and imparts thereto a strong blue fluorescence.

EXAMPLE 2

(Using a procedure as described in copending application Serial No. 35,986)

A mixture of 25 parts of 4,4'-diamino-stilbene-2,2'-disulfonic acid, 27.1 parts of 2,4-dimethoxy-benzoic acid, 81.1 parts of diethyl-cyclohexylamine, 217 parts of xylene and 43 parts of toluene is distilled, approximately 72 parts of distillate being taken off so as to remove traces of water. The mixture is cooled to 100° C., 10 parts of phosphorus oxychloride are added and the resultant slurry is heated at reflux for 2 hours. This is followed by two additions of 1.7 parts and one addition of 0.8 part of phosphorus oxychloride, each of which is followed by 1 hour's reflux. The mixture is refluxed for 2 hours longer, cooled to below 90° C., diluted with 500 parts of water and steam distilled with addition of a sufficient amount of sodium hydroxide to release the diethyl cyclohexylamine from its salts. Practically all the xylene, toluene and diethyl cyclohexylamine are contained in the oil layer of the distillate. After cooling the mixture, the product is filtered, washed with brine and dried. The product, sodium-4,4'-bis(2,4 - dimethoxy - benzoylamino) - stilbene - 2,2' - disulfonate, dyes cellulosic fibers from dilute aqueous solution and imparts to the fibers a strong blue fluorescence.

EXAMPLE 3

A mixture of 25 parts of 4,4'-diamino-stilbene-2,2'-disulfonic acid, 31 parts of 2,5-dimethoxy-benzoic acid, 14.1 parts of phosphorus oxychloride and 150 parts of pyridine is treated as described in Example 1. The pale tan product, sodium-4,4'-bis(2,5-dimethoxy-benzoylamino)-stilbene-2,2'-disulfonate, gives a blue fluorescence on cellulosic fibers.

The compounds given in the above examples have been isolated as the sodium salts of the sulfonic acids. By using potassium hydroxide in lieu of sodium hydroxide, the products may be obtained as potassium sulfonates. Isolation as the free sulfonic acids can be effected by acidification of the condensation mass, and the products thus obtained may be reacted with ammonium hydroxide or any suitable organic or inorganic base, to yield the corresponding salt.

Evaluation of the products of Examples 1 to 3 above on textile fiber has shown them to be blue-fluorescent dyes capable of imparting a stronger whitening effect to cellulosic fibers than other compounds of the benzoyl-amino-stilbene-disulfonic acid group which have previously been disclosed in the patent literature.

The following comparisons were made on dyeings of various fluorescents on paper, by using the beater-dyeing technique and judging the dyed paper in diffuse daylight:

*General formula*

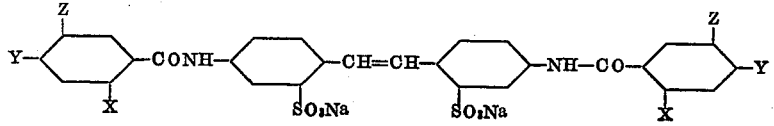

| Particular compound | X | Y | Z | Grams |
|---|---|---|---|---|
| p-methyl | H | CH₃ | H | 100 |
| p-methoxy | H | OCH₃ | H | 46 |
| 3,4-dimethoxy | H | OCH₃ | OCH₃ | 30 |
| 2,5-dimethoxy | OCH₃ | H | OCH₃ | 32 |
| 2,4-dimethoxy | OCH₃ | OCH₃ | H | 25 |

The column marked "Grams" shows the weights of the particular substances required to achieve a certain degree of whitening, assumed as standard.

Study of the above data shows the superiority on a weight basis of the new compounds of this invention as whitening agents over those previously disclosed.

In addition to producing a whitening effect upon textile material, our novel compounds may also be used for various other purposes where fluorescence or absorption of ultra-violet light is desirable, for instance to achieve fluorescent effects in costumes or stage settings, to achieve novel effects on photographic paper, as ultra-violet filters when impregnated on cellulosic fibers used for wrapping materials, etc.

We claim as our invention:

1. A compound of the general formula

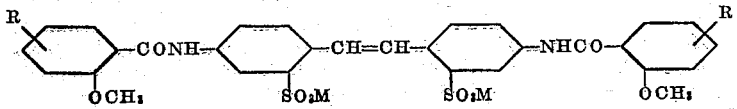

wherein M stands for a member of the group consisting of hydrogen, the alkali-metals and ammonium, and R designates a methoxy radical which is located in one of the positions 4,5.

2. 4,4'-bis(2,4-dimethoxy-benzoylamino)-stilbene-2,2'-disodium sulfonate.

3. 4,4'-bis(2,5-dimethoxy-benzoylamino)-stilbene-2,2'-disodium sulfonate.

References Cited in the file of this patent

UNITED STATES PATENTS 2,581,057   Wirth et al. _____ Jan. 1, 1952

FOREIGN PATENTS 584,484   Great Britain _____ Jan. 15, 1947

OTHER REFERENCES

Stobbe et al.: Ber., v. 46 (1913), pp. 1226–1238.